(12) United States Patent
Kondo

(10) Patent No.: US 10,203,502 B2
(45) Date of Patent: Feb. 12, 2019

(54) IMAGE DISPLAY APPARATUS

(71) Applicant: CANON KABUSHIKI KAISHA, Tokyo (JP)

(72) Inventor: Ryoji Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/211,210

(22) Filed: Jul. 15, 2016

(65) Prior Publication Data
US 2017/0023791 A1     Jan. 26, 2017

(30) Foreign Application Priority Data

Jul. 23, 2015    (JP) ................. 2015-146002

(51) Int. Cl.
| | |
|---|---|
| G02B 27/00 | (2006.01) |
| G02B 17/08 | (2006.01) |
| G02B 27/01 | (2006.01) |

(52) U.S. Cl.
CPC ....... *G02B 27/0172* (2013.01); *G02B 17/086* (2013.01); *G02B 17/0848* (2013.01); *G02B 27/0176* (2013.01); *G02B 2027/0169* (2013.01)

(58) Field of Classification Search
None
See application file for complete search history.

(56) References Cited

U.S. PATENT DOCUMENTS

| | | | |
|---|---|---|---|
| 5,861,995 A | 1/1999 | Togino | |
| 6,222,676 B1 | 4/2001 | Togino et al. | |
| 6,404,556 B1* | 6/2002 | Kobayashi | G02B 17/0848 |
| | | | 359/630 |
| 6,404,557 B2* | 6/2002 | Curley | G02B 17/04 |
| | | | 359/630 |

(Continued)

FOREIGN PATENT DOCUMENTS

| | | |
|---|---|---|
| CN | 1771454 A | 5/2006 |
| CN | 101846803 A | 9/2010 |

(Continued)

OTHER PUBLICATIONS

Extended European Search Report issued in European Appln. No. 16001599.6, dated Nov. 24, 2016.

(Continued)

*Primary Examiner* — William Lu
(74) *Attorney, Agent, or Firm* — Rossi, Kimms & McDowell LLP

(57) ABSTRACT

The image display apparatus includes an optical system causing a light flux entering from an original image through an entrance surface to reflect at a part of reflective surfaces, causing the reflected light flux to form an intermediate image, and then causing the light flux to reflect at another part of the reflective surfaces and exit from an exit surface toward an exit pupil located in a first direction. The optical element includes a first optical portion, a second optical portion provided in a second direction orthogonal to the first direction with respect to the first optical portion, and a (Continued)

connection portion to be connected to a holding portion provided in the apparatus. The connection portion is formed on a side face of the first optical portion so as to be included within a maximum width of the second optical portion.

12 Claims, 6 Drawing Sheets

(56) References Cited

U.S. PATENT DOCUMENTS

| | | | | |
|---|---|---|---|---|
| 6,510,006 | B1* | 1/2003 | Togino | A61B 1/00163 348/65 |
| 6,788,343 | B1* | 9/2004 | Togino | G02B 17/0848 348/337 |
| 7,012,756 | B2 | 3/2006 | Takagi et al. | |
| 9,557,567 | B2* | 1/2017 | Hiraide | G02B 27/0172 |
| 9,568,731 | B2* | 2/2017 | Takeda | G02B 27/0172 |
| 9,746,674 | B2* | 8/2017 | Hiraide | G02B 27/0172 |
| 2002/0005998 | A1* | 1/2002 | Nagata | G02B 27/0172 359/831 |
| 2002/0063913 | A1* | 5/2002 | Nakamura | G02B 27/017 359/15 |
| 2002/0097197 | A1* | 7/2002 | Togino | G02B 27/0172 345/8 |
| 2002/0105738 | A1* | 8/2002 | Kobayashi | G02B 5/04 359/834 |
| 2002/0163742 | A1* | 11/2002 | Togino | G02B 17/02 359/834 |
| 2003/0197943 | A1* | 10/2003 | Yamazaki | G02B 17/004 359/631 |
| 2005/0013005 | A1* | 1/2005 | Rogers | G02B 6/0008 359/630 |
| 2012/0081800 | A1* | 4/2012 | Cheng | G03B 21/00 359/720 |
| 2012/0162549 | A1* | 6/2012 | Gao | G02B 27/0172 349/11 |
| 2013/0027784 | A1* | 1/2013 | Takahashi | G02B 17/086 359/669 |
| 2013/0050835 | A1* | 2/2013 | Inoguchi | G02B 13/06 359/630 |
| 2013/0187836 | A1* | 7/2013 | Cheng | G02B 27/0172 345/8 |
| 2016/0062121 | A1* | 3/2016 | Border | G02B 27/0172 359/630 |

FOREIGN PATENT DOCUMENTS

| | | |
|---|---|---|
| JP | H10153748 A | 6/1998 |
| JP | H10268114 A | 10/1998 |
| JP | 2000105338 A | 4/2000 |
| JP | 2000187177 A | 7/2000 |
| JP | 2000227554 A | 8/2000 |
| JP | 2000333098 A | 11/2000 |
| JP | 2003149588 A | 5/2003 |
| KR | 1020060031377 A | 4/2006 |
| SU | 1633371 A1 | 3/1991 |

OTHER PUBLICATIONS

Office Action issued in Japanese Appln. No. 2015-146002 dated Jun. 6, 2017.
Office Action issued in Chinese Application No. 201610567012.1 dated Sep. 19, 2018. English translation provided.

* cited by examiner

IMAGE DISPLAY APPARATUS

BACKGROUND OF THE INVENTION

Field of the Invention

The present invention relates to image display apparatuses such as a head-mounted display (HMD) and a projector Description of the Related Art Image display apparatuses each having a display optical system that magnifies an original image formed on an image forming element such as a liquid crystal element and presenting a magnified observation image to an observer are desirable to be compact and have a wide angle of view. In particular, an HMD to be mounted on a head of the observer observing the observation image through his/her right and left eyes includes right and left paired image forming elements and right and left paired display optical systems, so that a decrease in size thereof is important.

Japanese Patent Laid-Open Nos. 10-153748 and 2000-105338 each disclose an image display apparatus using as a display optical system an eccentric prism whose reflective surfaces having optical powers are eccentrically arranged.

Furthermore, U.S. Pat. No. 5,861,995 discloses a holding structure for positioning and holding, in an image display apparatus, a prism constituting a display optical system.

An increase in angle of view of the display optical system in the HMD increases a maximum optical effective area (a required area of an optical surface having an optical function), which results in an increase in size of the display optical system. The increase in size of each of the right and left display optical systems causes a physical interference therebetween.

A person's interpupillary distance, which is a distance between person's right and left eyes, is about 60 mm in general. A interpupillary directional width of each display optical system, which is its size in a interpupillary direction in which the right and left eyes are arranged, is necessary to be smaller than at least the person's interpupillary distance.

Moreover, when the image display apparatus is provided with an interpupillary distance adjustment mechanism for adjusting a distance between the right and left display optical systems so as to match that distance to an observer's interpupillary distance, the interpupillary directional width of each display optical system defines a smallest adjustable distance between the right and left display optical systems, so that the interpupillary directional width is desirable to be as small as possible.

However, an optical element such as a prism constituting each display optical system is necessary to have a connection portion connected to a holding portion (or supporting member) in the image display apparatus such that the optical element is held at a fixed position in the image display apparatus. If the connection portion protrudes, in the interpupillary direction, further outside than a maximum width of an optical portion necessary for image observation in the optical element, an interpupillary directional space necessary for arranging each display optical system is increased by an amount corresponding to the protrusion, which results in an increases in size of the entire image display apparatus and in a restriction in interpupillary distance adjustable amount.

SUMMARY OF THE INVENTION

The present invention provides an image display apparatus that is capable of presenting a wide angle-of-view observation image and that can reduce an interpupillary directional width of an optical element constituting a display optical system and including a connection portion.

The present invention provides as an aspect thereof an image display apparatus including an image forming element configured to form an original image, and a display optical system formed by an optical element whose inside surrounded by an entrance surface, multiple reflective surfaces and an exit surface is filled with an optical medium and configured to introduce a light flux from the original image to an exit pupil. The display optical system is configured to cause the light flux entering from the original image by being transmitted through the entrance surface to reflect at a part of the reflective surfaces, to cause the reflected light flux to form an intermediate image in the display optical system and to cause the light flux to reflect at another part of the reflective surfaces and exit from the exit surface toward the exit pupil located in a first direction. The optical element includes a first optical portion on which the entrance surface and the part of the reflective surfaces are formed, a second optical portion that is provided in a second direction orthogonal to the first direction with respect to the first optical portion and on which the other part of the reflective surfaces and the exit surface are formed, and a connection portion configured to be connected to a holding portion that is provided, as a different portion from the connection portion, for holding the optical element in the image display apparatus. The first optical portion has a side face in a width direction orthogonal to the first and second directions, and the connection portion is formed on the side face so as to be included within a maximum width of the second optical portion in the width direction.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Description will be made of an HMD as an image display apparatus that is an embodiment of the present invention. First, with referring to FIG. 1, a coordinate system and terms in the embodiment (and in specific numerical examples described later) will be described.

Figure 1:
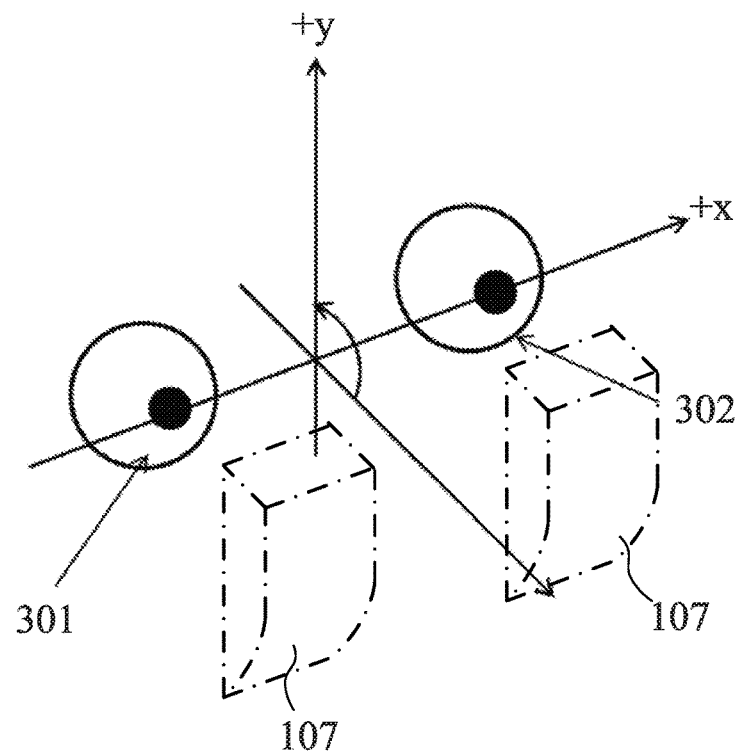
FIG. 1 illustrates a coordinate system in an embodiment of the present invention.

In FIG. 1, reference numeral 301 denotes a right eye of an observer, and 302 a left eye of the observer. The coordinate system has a z-axis extending in a visual axis direction of the observer and an x-axis orthogonal to the z-axis and extending in an interpupillary direction in which the right and left eyes 301 and 302 are arranged. The coordinate system also has a y-axis extending in a direction orthogonal to the x- and z-axes. In the following description, a direction in which the x-axis extends, which is the interpupillary direction, is referred to as "a horizontal direction", and a direction in which the y-axis extends is referred to as "a vertical direction".

Furthermore, as to an angle of view of an observation image (presented image) observed by the observer, the angle of view in the horizontal direction is referred to as "a horizontal angle of view", and the angle of view in the vertical direction is referred to as "a vertical angle of view". In addition, a rotational angle about the x-axis is represented by "a".

In FIG. 1, reference numeral 107 denotes a display optical system, which will be described in detail later; right and left display optical systems 107 are arranged in the horizontal direction so as to respectively correspond to the right and left eyes 301 and 302 of the observer.

Figure 2:
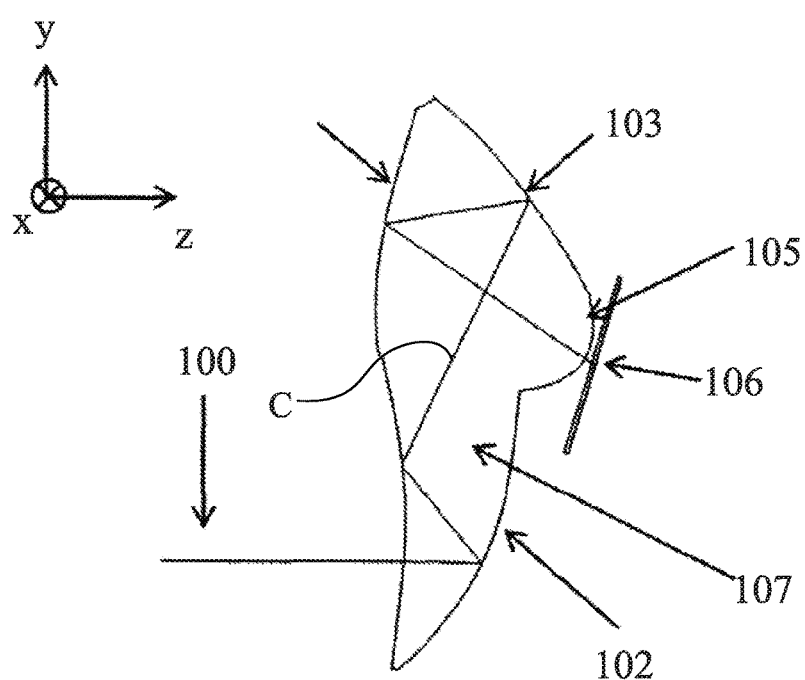
FIG. 2 illustrates a configuration of an image display apparatus that is the embodiment of the present invention and a central-view-angle principal ray therein.
Figure 3:
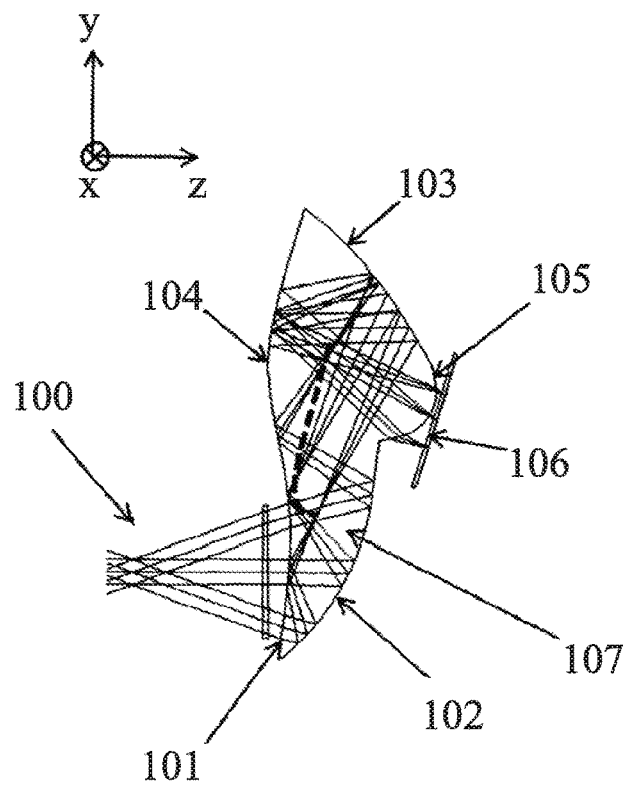
FIG. 3 illustrates a light flux and an intermediate image in the image display apparatus of the embodiment.

FIGS. 2 and 3 illustrate a configuration of the image display apparatus of the embodiment. These drawings illustrate only one of the right and left display optical systems 107 illustrated in FIG. 1. FIG. 2 illustrates a central-view-angle principal ray C proceeding in the image display apparatus; the central-view-angle principal ray C will be described later. FIG. 3 illustrates a flux of rays (hereinafter referred to as "a light flux") proceeding in the image display apparatus.

In FIGS. 2 and 3, reference numeral 106 denotes an image forming element (image display element) such as a liquid crystal element (LCD) or an organic electro luminescence (EL) element. The image forming element 106 forms an original image.

The display optical system 107 has as optical surfaces a first surface 101, a second surface 102, a third surface 103, a fourth surface 104 and a fifth surface 105. The first surface 101 serves as a reflective surface and a transmissive surface. The second surface 102 serves as a reflective surface, and the third surface 103 serves as a reflective surface. The fourth surface 104 serves as a reflective surface, and the fifth surface 105 serves as a transmissive surface. The display optical system 107 is formed by one prism (optical element) whose inside surrounded by the first to fifth surfaces 101 to 105 is filled with an optical medium such as glass or plastic. The second, third and fourth surfaces 102, 103 and 104 that are reflective surfaces in the prism are each provided with a high-reflectance reflective film formed by metal deposition or the like.

In an optical system like the display optical system 107 in this embodiment using multiple reflective surfaces mutually eccentric, folding an optical path enables making the entire optical system compact. However, each reflective surface has a higher sensitivity to an eccentric error than that of a refractive surface, so that a highly accurate position adjustment (assembling adjustment) for adjusting relative positional relations of the reflective surfaces is required. In contrast, forming the optical system having an optical power as one prism like this embodiment can eliminate such an assembling adjustment.

Reference numeral 100 denotes an exit pupil of the display optical system 107. An observer placing his/her eye at a position of the exit pupil 100 can observe a presented image (observation image) that is a magnified image of the original image formed on the image forming element 106.

In the image display apparatus configured as above, the light flux emitted from the original image on the image forming element 106 and including the central-view-angle principal ray C is transmitted through the fifth surface 105 to enter the display optical system 107. The central-view-angle principal ray C is a ray emitted from a center of an original image forming area of the image forming element 106 in which the original image is formed and passing through a center of the exit pupil 100.

The light flux entering the display optical system 107 from the fifth surface 105 is reflected by the fourth surface 104, the third surface 103, the first surface 101 and the second surface 102 in this order, is transmitted through the first surface 101 to exit from the display optical system 107 and then reaches the exit pupil 100. The reflection at the first surface 101 is internal total reflection.

Although this embodiment describes a case where the first surface 101 serves as reflective and transmissive surfaces by utilizing internal total reflection that increases light utilization efficiency, the first surface 101 may serve as reflective and transmissive surfaces by using a half-transmissive film.

Furthermore, the display optical system 107 in this embodiment causes at least part of an optical path of the light flux proceeding from the fifth surface 105 to the fourth surface 104 to intersect with at least part of an optical path of the light flux proceeding from the third surface 103 to the first surface 101. This intersection of the optical paths enables reducing a size of the entire display optical system 107 while providing a required optical path length.

Moreover, as illustrated in FIG. 3, the display optical system 107 causes the light flux from the original image to form thereinside an intermediate image (illustrated by a broken line). In FIG. 3, of the first to fifth surfaces 101 to 105, the fifth, fourth and third surfaces 105, 104 and 103 near the image forming element 106 cause the light flux to form the intermediate image. The display optical system 107 introduces the light flux from the intermediate image to the exit pupil 100 by the second and first surfaces 102 and 101.

The display optical system 107 forming such an intermediate image thereinside enables increasing a freedom degree of setting of a display angle of view with respect to a size of the image forming element 106 (that is, of the original image forming area).

Furthermore, the display optical system 107 can be divided in terms of optical functions into a relay optical system that forms the intermediate image and is constituted by the fifth, fourth and third surfaces 105, 104 and 103 and an observation optical system that forms a virtual image of the intermediate image and is constituted by the second and first surfaces 102 and 101. This division enables decreasing an optical power of the observation optical system while increasing the angle of view, which enables reducing an optical power burden on the observation optical system, in particular, that of the second surface 102 having a positive optical power. Consequently, the display optical system 107 can easily provide a sufficient eye relief, which is a distance between the eye of the observer and the display optical system 107, and therefore can realize an image display apparatus enabling a comfortable image observation with a wide angle of view.

In addition, as illustrated in FIG. 3, the relay optical system forms the intermediate image so as to cancel out aberrations such as field curvature generated in the observation optical system, which reduces a burden of aberration correction on the observation optical system and thereby can realize an image display apparatus capable of presenting a high quality observation image whose aberrations are sufficiently corrected. When one prism whose multiple optical surfaces have optical powers forms an intermediate image thereinside, a small number of times of reflections of a light flux inside the prism increases an optical power burden on each optical element, which makes it difficult to correct aberrations. Thus, it is necessary to reflect the light flux three or more times. The display optical system 107 in this embodiment reflects the light flux four or more times and thus enables presenting an observation image whose aberrations are sufficiently corrected.

Figure 4:
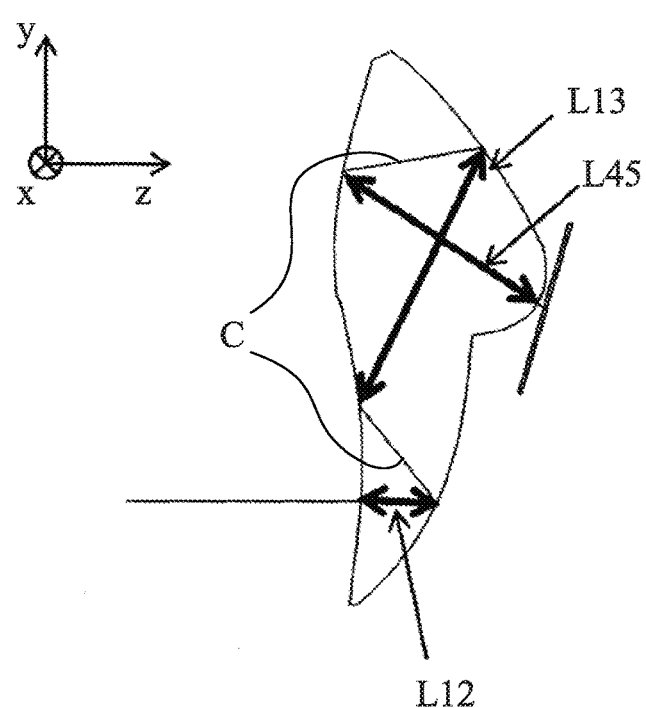
FIG. 4 illustrates hit point distances between optical surfaces in the image display apparatus of Embodiment 1.

The display optical system 107 in this embodiment is configured to satisfy the following conditions. FIG. 4 illustrates hit point distances L12, L13 and L45 used in the conditions. A distance between hit points of the central-view-angle principal ray C on two surfaces of the optical surfaces (first to fifth surfaces 101 to 105) is referred to as "a hit point distance" between the two surfaces. In FIG. 4, the hit point distance L12 represents one between the first and second surfaces 101 and 102, the hit point distance L13 represents one between the first and third surfaces 101 and 103, and the hit point distance L45 represents one between the fourth and fifth surfaces 104 and 105.

First, the hit point distances L12 and L45 satisfy conditions expressed by following expressions (1) and (2).

$$0.62 \leq L12/f \leq 5.00 \quad (1)$$

$$1.80 \leq L45/L12 \leq 5.00 \quad (2)$$

In the condition of expression (1), a value of L12/f equal to or larger than the lower limit is necessary as a condition in order that the light flux reflected by the first surface 101 be reflected by the second surface 102 in the prism as the display optical system 107 providing a wide angle of view. Not satisfying this condition generates vignetting of the light flux (in other words, an image lack) or excessively thins a portion of the prism between the first and second surfaces 101 and 102 to decrease a mechanical strength of this portion. On the other hand, a higher value of L12/f than the upper limit of the condition of expression (1) excessively increases an optical effective area of the second surface 102, which results in an increase in size of the relay optical system and thereby makes it difficult to make the entire display optical system 107 compact.

In the condition of expression (2), a value of L45/L12 equal to or larger than the lower limit is necessary as a condition in order that the light flux necessary for image display propagate in the above-described order in the display optical system 107 providing a wide angle of view and satisfying the condition of expression (1). Not satisfying this condition of expression (2) generates vignetting of the light flux, which makes it difficult to present a good observation image including no image lack. Furthermore, not satisfying the condition of expression (2) makes it difficult to provide a necessary optical path length of the relay optical system forming the intermediate image, which results in an increase in optical power burden on each optical element and thereby makes it difficult to correct aberrations sufficiently. On the other hand, a higher value of L45/L12 than the upper limit of the condition of expression (2) excessively increases an optical effective area of the fourth surface 104, which results in an increase in size of the relay optical system and thereby makes it difficult to make the entire display optical system 107 compact.

It is desirable to change at least one of the conditions of expressions (1) and (2) to a condition expressed by following expression (3) or a condition expressed by following expression (4).

$$0.70 \leq L12/f \leq 3.00 \quad (3)$$

$$2.00 \leq L45/L12 \leq 4.00 \quad (4)$$

Satisfying at least one of the conditions of expressions (3) and (4) enables realizing a well-balanced image display apparatus, while being compact as a whole, that can provide a sufficient space in the prism and that can present a good observation image whose aberrations are sufficiently corrected.

Furthermore, the display optical system 107 (hit point distances L13 and L45) is desirable to satisfy, in addition to the conditions of expressions (1) (or (3)) and (2) (or (4)), a condition expressed by following expression (5).

$$0.48 \leq L45/L13 \leq 5.00 \quad (5)$$

Satisfying the condition of expression (5) enables realizing a display optical system whose relay and observation optical systems are well-balanced in size and that effectively utilizes the space in the prism, which enables realizing a compact image display apparatus capable of presenting a good observation image. A lower value of L45/L13 than the lower limit of the condition of expression (5) makes the relay and observation optical systems excessively distant from each other, which increases the size of the display optical system 107 in spite of folding the optical path. Furthermore, the lower value of L45/L13 than the lower limit of the condition of expression (5) excessively spreads the light flux proceeding toward the observation optical system, which makes it difficult to make the observation optical system compact and thus makes it difficult to make the entire display optical system 107 compact. On the other hand, a higher value of L45/L13 than the upper limit of the condition of expression (5) excessively increases the optical effective area of the fourth surface 104, which makes it difficult to make the entire display optical system 107 compact.

It is more desirable to change the condition of expression (5) to a condition expressed by following expression (6).

$$0.60 \leq L45/L13 \leq 3.00 \quad (6)$$

Satisfying the condition of expression (6) enables realizing a display optical system whose relay and observation optical systems are further well-balanced in size and that further effectively utilizes the space in the prism, which realizing a further compact image display apparatus capable of presenting a good observation image.

The above-described embodiment enables realizing a compact image display apparatus that provides a wider angle of view than those of conventional ones and that is capable of presenting a high quality observation image. For example, the image display apparatus of this embodiment enables providing a horizontal angle of view of 50° or larger (more desirably, 57° or larger) and a vertical angle of view of 30° or larger (more desirably, 37° or larger).

Figure 5:
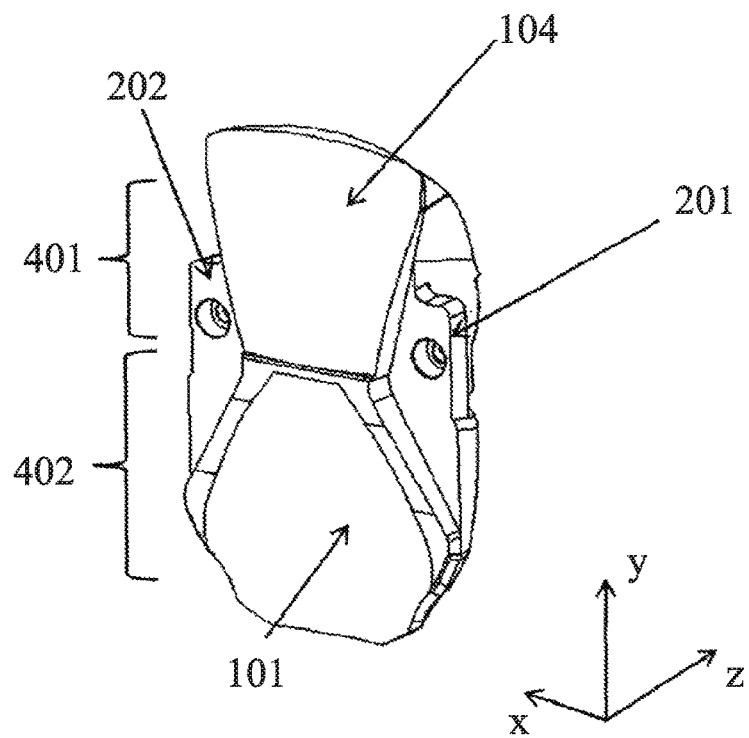
FIG. 5 is an external view of a prism in the embodiment (Numerical Example 1).
Figure 6:
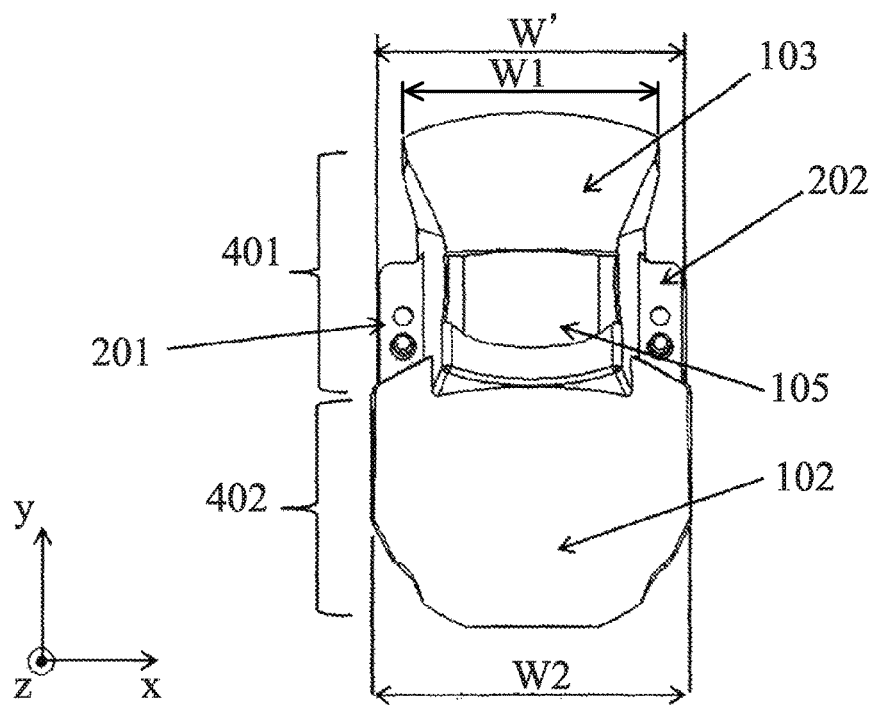
FIG. 6 illustrates a width of the prism in the embodiment (Numerical Example 1).

FIGS. 5 and 6 illustrate an external configuration of the prism constituting the display optical system 107. Reference numeral 401 denotes a relay optical portion as a first optical portion of the prism, which constitutes the relay optical system. The relay optical portion 401 has thereon the fifth surface 105 serving as an entrance surface and the fourth and third surfaces 104 and 103 serving as a part of the multiple reflective surfaces in the display optical system 107.

Reference numeral 402 denotes an observation optical portion as a second optical portion of the prism, which constitutes the observation optical system. The observation optical portion 402 has thereon the second surface 102 included in another part of the multiple reflective surfaces and the first surface 101 included in the other part of reflective surfaces and serving as an exit surface. The light flux exiting from the first surface 101 of the observation optical portion 402 proceeds toward the exit pupil 100 located in a first direction that is an opposite direction to the visual axis direction (z-axis direction).

Reference numerals 201 and 202 respectively denote a right connection portion and a left connection portion each configured to be connected to a holding portion (or a supporting member) such as a frame that is provided, as a different portion from the connection portion, for holding the prism in the image display apparatus. The holding portion is provided at a position different from the relay optical portion 401 in the width direction. The holding portion is not an optical element and is not an optical element for forming an optical path in the display optical system 107. Each of the connection portions 201 and 202 is provided with a protrusion (boss) and a hole for positioning the prism with respect to the holding portion.

As understood from FIG. 6, the observation optical portion 402 that causes the light flux form the original image to form the intermediate image is provided in the vertical direction as a second direction with respect to the relay optical portion 401 that magnifies the intermediate image to present the magnified observation image to the eyes of the observer. A maximum width W1 of the relay optical portion 401 in the horizontal direction (hereinafter referred also to as "a width direction") is smaller than a maximum width W2 of the observation optical portion 402 in the width direction.

For example, it is desirable to satisfy a condition expressed by following expression (7).

$$0.50 \leq W1/W2 \leq 0.95 \quad (7)$$

It is further desirable to satisfy a condition expressed by following expression (8).

$$0.63 \leq W1/W2 \leq 0.91 \quad (8)$$

In order to satisfy the above conditions, this embodiment forms right and left side faces on the relay optical portion 401 as its side faces in the width direction (interpupillary direction) and forms the right and left connection portions 201 and 202, which are integral with the prism, on the right and left side faces of the relay optical portion 401 such that the right and left connection portions 201 and 202 are included within the maximum width W2 of the observation optical portion 402 in the width direction. That is, this embodiment forms the right and left connection portions 201 and 202 such that a width W' between a right end of the right connection portion 201 and a left end of the left connection portion 202 is equal to or smaller than the maximum width W2 of the observation optical portion 402. The width W' is hereinafter referred to as "a maximum width of the right and left connection portions 201 and 202". The maximum width W2 of the observation optical portion 402 means a dimension in the width direction obtained by summing a maximum value of an optical effective width necessary for image observation (that is, an effective width of the first or second surface 101 or 102) and a margin necessary for shaping the prism, forming the high-reflectance reflective film by the metal deposition and others.

The above-described embodiment causes the light flux to form the intermediate image in the prism in order to achieve a wide angle of view and provides the connection portions 201 and 202, each of which has a sufficient strength for causing the holding portion in the image display apparatus (HMD) to hold the prism, so as to be included within the maximum width W2 of the observation optical portion 402. Accordingly, when the prisms (display optical systems 107) are arranged right and left as illustrated in FIG. 1, an interference between these right and left prisms each including the connection portions 201 and 202 and a restriction of an adjustable amount of an interpupillary distance adjustment mechanism allowing an adjustment of a distance between the right and left prisms can be avoided. This embodiment allows the right and left prisms to be moved close to each other to positions at which the distance therebetween becomes 0.

The configuration of this embodiment is particularly effective for a case where the display optical system 107 provides a wide horizontal angle of view of 50° or larger and a difference between the maximum width W1 of the relay optical portion 401 and the maximum width W2 of the observation optical portion 402 is sufficient for forming the connection portions 201 and 202.

Next, description will be made of numerical examples according to the above-described embodiment.

NUMERICAL EXAMPLE 1

Figure 7:
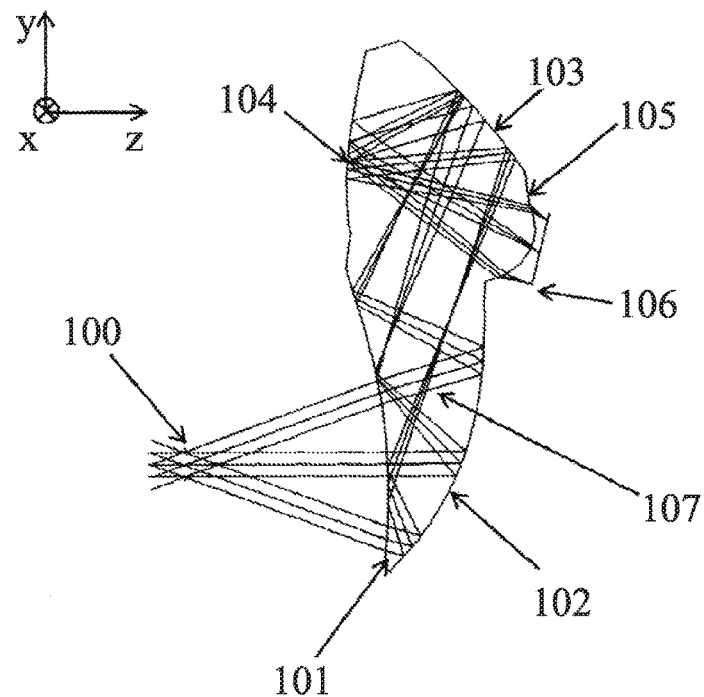
FIG. 7 illustrates an image display apparatus that is Numerical Example 1.

Table 1A shows optical data of Numerical Example 1, and FIG. 7 illustrates a sectional view of an optical path of this numerical example. In this numerical example, the image forming element 106 has a size of 18.4 mm×11.5 mm. The exit pupil 100 of the display optical system 107 has a horizontal diameter of about 7.6 mm and a vertical diameter of about 5.2 mm. The center of the exit pupil 100 is set at a rotational center position of an eyeball of an observer. The focal length of the display optical system 107 is about 16 mm. The display optical system (prism) 107 provides a horizontal angle of view of 60° and a vertical angle of view of 40° and displays an observation image at an infinite distance in a positive z-axis direction.

In the optical data shown in Table 1A, surface numbers S are given to optical surfaces in order in a direction from the virtual image toward an object as the image forming element 106, that is, in so-called a reverse ray tracing direction. Reference character S1 denotes a stop surface (exit pupil 100), and SI an original image forming surface (original image forming area) of the image forming element 106. In this numerical example, the optical surfaces S2 to S7 are non-rotationally symmetric (rotationally asymmetric) surfaces each having a surface-symmetric shape whose single plane of symmetry is a y-z sectional plane (paper surface) of FIG. 7.

Reference characters X, Y and Z (unit: mm) denotes a position (x, y, z) of a surface apex of each optical surface in a coordinate system in which an origin (0, 0, 0) is set at the center of S1, the y- and z-axes orthogonal to each other are taken in the paper surface of FIG. 7 and the x-axis is taken so as to be orthogonal to the paper surface of FIG. 7. Reference character A (unit: °) denotes a rotational angle of each optical surface about the x-axis when a counterclockwise direction in FIG. 7 is defined as a positive direction.

Reference character R denotes a curvature radius. A column of TYP shows surface shape types; SPH denotes a spherical surface, and FFS denotes a non-rotationally symmetric shape expressed by following expression (9) where z represents a sag amount of the surface, c represents an apex curvature, k represents a conic constant (0 in this numerical example) and $r=\sqrt{(x^2+y^2)}$.

$$z = \frac{cr^2}{1+\sqrt{1-(1+k)c^2r^2}} + \sum_{j=2}^{66} C_j x^m y^n \quad (9)$$

The second term in the right side of expression (9) is expressed by following expression (10) where $C_j$ represents an aspheric coefficient.

$$\sum_{j=2}^{66} C_j x^m y^n = C_2 X + C_3 Y + C_4 X^2 + X_5 XY + C_6 Y^2 + C_7 X^3 + \quad (10)$$
$$C_8 X^2 Y + C_9 XY^2 + C_{10} Y^3 + C_{11} X^4 + C_{12} X^3 Y + C_{13} X^2 Y^2 +$$

-continued
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 +$$
$$C_{36} Y^7 + C_{37} X^8 + C_{38} X^7 Y + C_{39} X^6 Y^2 + C_{40} X^5 Y^3 +$$
$$C_{41} X^4 Y^4 + C_{42} X^3 Y^5 + C_{43} X^2 Y^6 + C_{44} XY^7 + C_{45} Y^8 + \cdots$$

A numerical value added to FSS in the column of TYP shows that the surface shape corresponds to the aspheric coefficient $C_j$ listed in Table 1B. Non-listed aspheric coefficients $C_j$ are 0.

In Table 1A, Nd and vd respectively represent a refractive index and an abbe number of a medium after the optical surface for a d-line. When the medium is air, only its refractive index Nd, which is 1.000, is shown and its Abbe number is omitted. The optical surface S2 corresponds to the first surface (transmissive surface) 101, the optical surface S3 corresponds to the second surface (reflective surface) 102, the optical surface S4 corresponds to the first surface (reflective surface) 101, the optical surface S5 corresponds to the third surface (reflective surface) 103, the optical surface S6 corresponds to the fourth surface (internal total reflective surface) 104, and the optical surface S7 corresponds to the fifth surface (transmissive surface) 105.

TABLE 1A

| S | TYP | R | X | Y | Z | A | Nd | vd |
|---|-----|---|---|---|---|---|----|-----|
| 1 | SPH | ∞ | 0 | 0 | 0 | 0 | 1.00000 | |
| 2 | FFS1 | ∞ | 0 | 2.231 | 33.565 | −3.270 | 1.53151 | 55.7 |
| 3 | FFS2 | ∞ | 0 | 4.759 | 48.479 | −19.928 | 1.53151 | 55.7 |
| 4 | FFS1 | ∞ | 0 | 2.231 | 33.565 | −3.270 | 1.53151 | 55.7 |
| 5 | FFS3 | ∞ | 0 | 92.469 | −27.324 | 81.407 | 1.53151 | 55.7 |
| 6 | FFS4 | ∞ | 0 | 28.976 | 30.249 | 11.397 | 1.53151 | 55.7 |
| 7 | FFS5 | ∞ | 0 | 31.244 | 62.217 | −45.987 | 1.00000 | |
| I | SPH | ∞ | 0 | 29.651 | 63.755 | −17.474 | | |

TABLE 1B

| Coefficient | FFS1 | FFS2 | FFS3 | FFS4 | FFS5 |
|-------------|------|------|------|------|------|
| C4 | −9.0936E−03 | −1.3105E−02 | −1.3713E−02 | 5.8141E−03 | −2.2773E−02 |
| C6 | −5.1745E−03 | −9.6901E−03 | 2.4693E−03 | 6.3888E−03 | −5.2465E−02 |
| C8 | −3.0703E−04 | −1.8810E−05 | −7.9683E−05 | 5.1313E−05 | −2.4952E−03 |
| C10 | −9.1877E−05 | 3.9002E−05 | 4.1887E−05 | 1.5174E−04 | −6.4656E−04 |
| C11 | −2.2738E−06 | −2.1152E−06 | −9.0780E−06 | 2.2403E−06 | 2.4717E−04 |
| C13 | −9.3240E−06 | −2.0863E−06 | 7.5845E−07 | −3.0725E−07 | −9.0284E−05 |
| C15 | 1.9002E−06 | 7.5704E−07 | −3.8378E−07 | −2.6912E−06 | −1.2941E−04 |
| C17 | 2.4301E−07 | 1.4354E−09 | −8.9511E−08 | −1.1484E−07 | 1.6225E−05 |
| C19 | −3.9825E−07 | 9.6476E−10 | 1.4203E−08 | −4.6483E−08 | −1.8856E−05 |
| C21 | 2.9997E−09 | 6.0571E−08 | −1.6390E−09 | −1.2207E−09 | −1.0965E−05 |
| C22 | 1.6149E−08 | −7.4246E−11 | −5.1129E−09 | −7.5758E−09 | −2.3771E−06 |
| C24 | 7.4596E−09 | −8.3705E−10 | 4.8888E−10 | −1.8013E−09 | −1.5635E−06 |
| C26 | −8.4565E−09 | 1.0080E−09 | 3.0281E−12 | −3.5117E−10 | −9.0751E−07 |
| C28 | 2.1565E−10 | 1.9324E−09 | −1.0984E−13 | −1.5069E−11 | 4.6250E−07 |
| C30 | 6.0909E−11 | −2.4641E−12 | 1.5474E−11 | 5.3979E−10 | −3.5705E−08 |
| C32 | 1.1048E−09 | 3.7419E−11 | −2.8655E−12 | −1.9790E−11 | −1.4158E−07 |
| C34 | 8.3556E−10 | 6.2012E−11 | −7.4247E−16 | −2.3905E−11 | 2.8982E−08 |
| C36 | 4.7962E−12 | 2.7818E−11 | −5.1860E−15 | 9.0549E−14 | 7.9518E−09 |
| C37 | −1.1286E−11 | 7.1352E−13 | 3.4918E−12 | −1.2625E−12 | 7.7556E−09 |
| C39 | 1.1866E−12 | 8.4567E−13 | 7.4296E−13 | −9.4370E−12 | 1.4205E−08 |
| C41 | 7.0678E−11 | 2.5944E−13 | −8.6412E−14 | 1.6233E−12 | 1.9692E−09 |
| C43 | −7.8099E−12 | −5.3314E−13 | −2.4518E−16 | 4.6303E−13 | 4.2408E−09 |
| C45 | 1.3334E−13 | −2.3306E−13 | 7.6962E−17 | 5.5773E−15 | 7.8790E−10 |

FIGS. 5 and 6 described above illustrate an external configuration of the prism of this numerical example. In this numerical example, the maximum width W2 of the observation optical portion 402 is defined by the second surface 102 and is 54 mm. The maximum width W1 of the relay optical portion 401 is 44 mm. The maximum width W' of the connection portions 201 and 202 is 53 mm that is smaller than W2=54 mm.

NUMERICAL EXAMPLE 2

Figure 8:
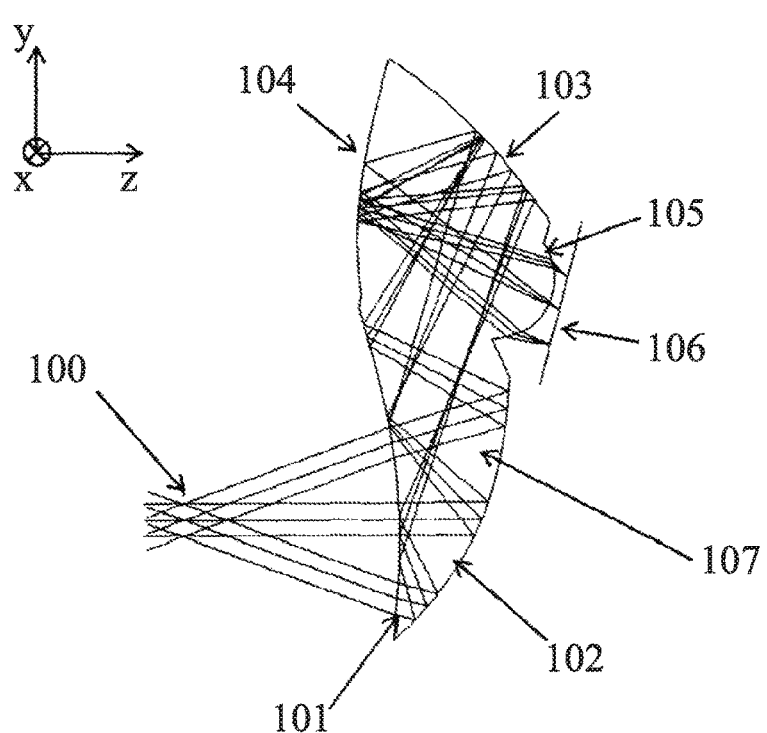
FIG. 8 illustrates an image display apparatus that is Numerical Example 2.

Table 2A shows optical data of Numerical Example 2, and FIG. 8 illustrates a sectional view of an optical path of this numerical example. In this numerical example, the image forming element 106 has a size of 18.4 mm×11.5 mm. The exit pupil 100 of the display optical system 107 has a horizontal diameter of about 4.6 mm and a vertical diameter of about 4.3 mm. The center of the exit pupil 100 is set at the rotational center position of the eyeball of the observer. The focal length of the display optical system 107 is about 16 mm. The display optical system (prism) 107 provides a horizontal angle of view of 60° and a vertical angle of view of 40° and displays an observation image at the infinite distance in the positive z-axis direction. Meanings of the optical data are identical to those of Numerical Example 1. Table 2B lists aspheric coefficients in this numerical example.

TABLE 2A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −7.056 | 35.838 | −2.028 | 1.53151 | 55.7 |
| 3 | FFS2 | ∞ | 0 | −2.389 | 48.210 | −25.749 | 1.53151 | 55.7 |
| 4 | FFS1 | ∞ | 0 | −7.056 | 35.838 | −2.028 | 1.53151 | 55.7 |
| 5 | FFS3 | ∞ | 0 | 92.922 | −31.003 | 82.072 | 1.53151 | 55.7 |
| 6 | FFS4 | ∞ | 0 | 26.325 | 32.432 | 20.538 | 1.53151 | 55.7 |
| 7 | FFS5 | ∞ | 0 | 33.370 | 59.803 | −34.348 | 1.00000 | |
| I | SPH | ∞ | 0 | 35.147 | 62.629 | −14.833 | | |

TABLE 2B

| Coefficient | FFS1 | FFS2 | FFS3 | FFS4 | FFS5 |
|---|---|---|---|---|---|
| C4 | −6.8451E−03 | −1.2356E−02 | −9.4712E−03 | 6.0193E−03 | −2.3544E−02 |
| C6 | −4.0294E−03 | −9.6787E−03 | 4.6624E−04 | 7.4419E−03 | −5.0623E−02 |
| C8 | −1.5921E−04 | −9.2675E−06 | −1.1840E−05 | 1.0618E−04 | 2.0467E−04 |
| C10 | −5.1724E−05 | 7.4669E−06 | 2.4067E−05 | 1.6358E−04 | 2.2357E−03 |
| C11 | −5.7359E−07 | −1.7164E−06 | −1.0949E−05 | 9.4530E−07 | 2.3249E−04 |
| C13 | −2.1106E−06 | −1.6309E−06 | 1.9452E−06 | −3.2163E−06 | 1.7606E−04 |
| C15 | 3.4726E−07 | −3.5587E−07 | −2.2225E−07 | −2.7931E−06 | −3.1708E−04 |
| C17 | −4.9518E−08 | 6.4858E−09 | −1.1479E−07 | −7.6155E−08 | 6.0359E−06 |
| C19 | −1.0727E−07 | 4.4520E−09 | 3.6990E−09 | −2.6755E−08 | −2.5646E−05 |
| C21 | 1.8424E−08 | 3.1596E−08 | −6.2258E−10 | 1.5210E−10 | −3.3272E−05 |
| C22 | −2.3160E−09 | −6.6793E−10 | −2.0244E−09 | 2.6843E−09 | −1.1259E−06 |
| C24 | −8.9880E−11 | −1.5009E−09 | 1.3689E−10 | −1.0052E−09 | −2.7990E−06 |
| C26 | −6.3442E−09 | −9.7100E−10 | −1.5934E−11 | −6.1837E−11 | −4.2181E−07 |
| C28 | −1.3951E−10 | 7.9695E−11 | 9.0132E−14 | 3.2019E−11 | 1.8541E−06 |
| C30 | −3.1019E−11 | 1.6869E−11 | 5.7185E−12 | −3.5404E−11 | 7.5580E−09 |
| C32 | 2.7669E−10 | 6.4758E−11 | 3.7458E−13 | 8.4752E−12 | −1.5692E−07 |
| C34 | −6.7295E−12 | 5.0292E−11 | −1.2735E−14 | 1.2266E−12 | 8.2962E−08 |
| C36 | 1.3918E−13 | −8.6286E−12 | −1.9605E−15 | 2.1375E−13 | 3.4569E−08 |
| C37 | 3.7983E−12 | −2.1219E−13 | 9.5414E−13 | −2.3637E−12 | 5.1296E−09 |
| C39 | −4.1545E−12 | 3.4353E−13 | 3.7668E−13 | −3.9777E−12 | −3.9827E−09 |
| C41 | 1.6648E−11 | −1.4694E−12 | −9.8650E−15 | 6.7951E−14 | 3.5384E−08 |
| C43 | 3.7216E−12 | −1.7234E−13 | 4.4395E−17 | 7.3488E−15 | −4.8737E−09 |
| C45 | −7.0994E−16 | 7.3533E−13 | 3.0533E−17 | 1.3887E−15 | −6.9394E−09 |

Figure 9:
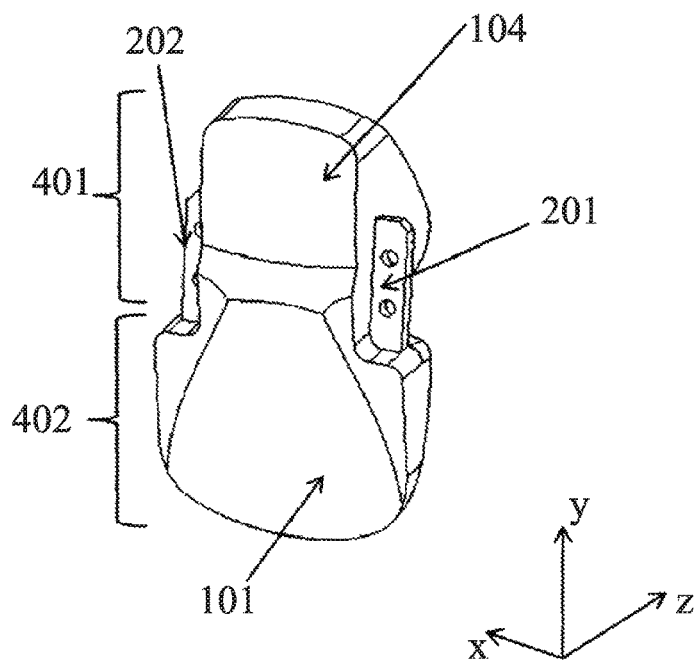
FIG. 9 is an external view of a prism of Numerical Example 2.
Figure 10:
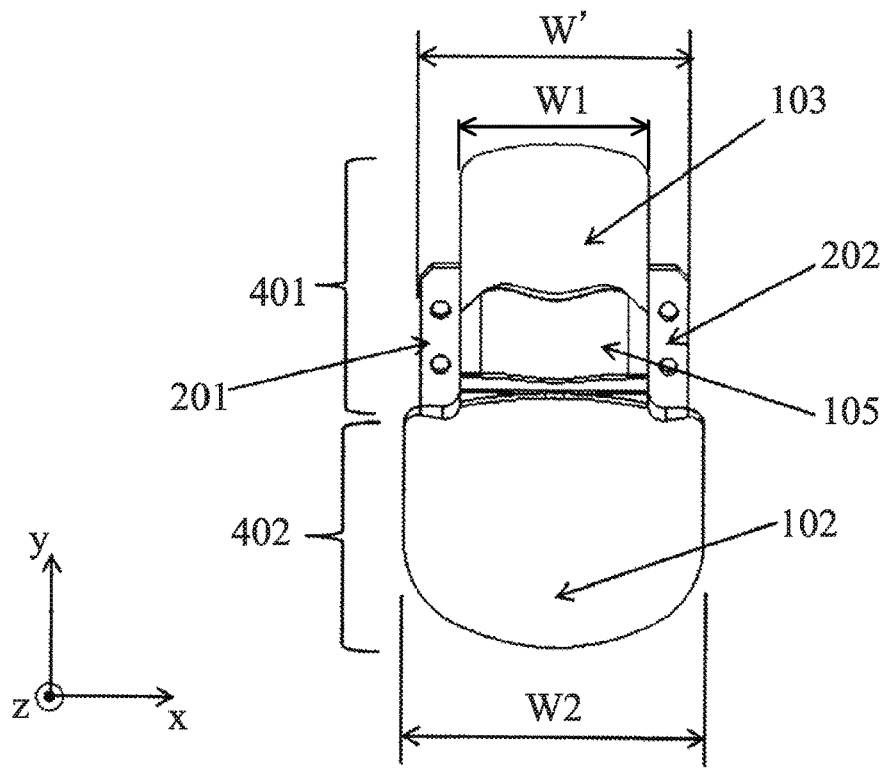
FIG. 10 illustrates a width of the prism in Numerical Example 2.

FIGS. 9 and 10 illustrate an external configuration of the prism of this numerical example. In this numerical example, the maximum width W2 of the observation optical portion 402 is defined by the second surface 102 and is 58 mm. The maximum width W1 of the relay optical portion 401 is 40 mm. The maximum width W' of the connection portions 201 and 202 is 49 mm that is smaller than W2=58 mm.

NUMERICAL EXAMPLE 3

Figure 11:
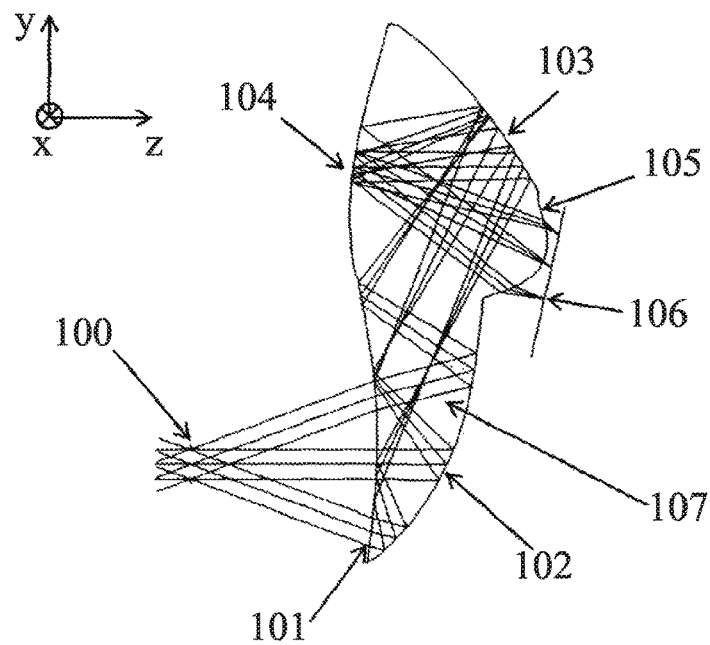
FIG. 11 illustrates an image display apparatus that is Numerical Example 3.

Table 3A shows optical data of Numerical Example 3, and FIG. 11 illustrates a sectional view of an optical path of this numerical example. In this numerical example, the image forming element 106 has a size of 18.4 mm×11.5 mm. The exit pupil 100 of the display optical system 107 has a horizontal diameter of about 5.6 mm and a vertical diameter of about 5.6 mm. The center of the exit pupil 100 is set at the rotational center position of the eyeball of the observer. The focal length of the display optical system 107 is about 16 mm. The display optical system (prism) 107 provides a horizontal angle of view of 60° and a vertical angle of view of 40° and displays an observation image at the infinite distance in the positive z-axis direction. Meanings of the optical data are identical to those of Numerical Example 1. Table 3B lists aspheric coefficients in this numerical example.

TABLE 3A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −3.582 | 33.665 | −4.006 | 1.53151 | 55.7 |
| 3 | FFS2 | ∞ | 0 | −1.271 | 45.680 | −27.065 | 1.53151 | 55.7 |
| 4 | FFS1 | ∞ | 0 | −3.582 | 33.665 | −4.006 | 1.53151 | 55.7 |
| 5 | FFS3 | ∞ | 0 | 96.589 | −29.229 | 82.112 | 1.53151 | 55.7 |
| 6 | FFS4 | ∞ | 0 | 28.728 | 31.024 | 14.197 | 1.53151 | 55.7 |
| 7 | FFS5 | ∞ | 0 | 32.805 | 61.050 | −54.707 | 1.00000 | |
| I | SPH | ∞ | 0 | 32.321 | 64.719 | −13.391 | | |

TABLE 3B

| Coefficient | FFS1 | FFS2 | FFS3 | FFS4 | FFS5 |
|---|---|---|---|---|---|
| C4 | −1.0187E−02 | −1.3291E−02 | −1.0403E−02 | 6.1508E−03 | −1.8379E−02 |
| C6 | −3.4197E−03 | −9.7005E−03 | 1.0965E−03 | 5.8720E−03 | −4.5737E−02 |
| C8 | −1.8947E−04 | −3.0804E−06 | −3.9526E−05 | 9.0294E−05 | −1.7396E−03 |
| C10 | −8.3002E−05 | 1.1332E−05 | 2.9574E−05 | 1.6241E−04 | −1.9243E−03 |

TABLE 3B-continued

| Coefficient | FFS1 | FFS2 | FFS3 | FFS4 | FFS5 |
|---|---|---|---|---|---|
| C11 | 2.8158E−06 | −1.8251E−06 | −8.7532E−06 | 1.7595E−07 | 1.1335E−04 |
| C13 | −5.7816E−06 | −1.6667E−06 | 3.9075E−07 | −2.9951E−08 | −8.6981E−05 |
| C15 | 9.9144E−07 | 2.0657E−07 | −2.7673E−07 | −2.5019E−06 | −1.7115E−04 |
| C17 | 2.6047E−08 | 8.9490E−09 | −1.0259E−07 | −7.1156E−08 | 1.9174E−05 |
| C19 | −1.1731E−07 | 2.6523E−08 | 7.8831E−09 | −1.3947E−08 | −8.1353E−06 |
| C21 | 1.6846E−08 | 3.9174E−08 | −7.3000E−10 | −1.9598E−06 | −3.3100E−05 |
| C22 | −1.0578E−09 | −6.5069E−10 | 9.0733E−10 | 4.0796E−09 | −1.6309E−07 |
| C24 | 3.5119E−09 | −1.1893E−09 | −8.1073E−11 | −8.4333E−10 | 1.1436E−06 |
| C26 | 2.9691E−09 | −1.5799E−09 | −1.0057E−11 | −9.5676E−11 | −1.1842E−06 |
| C28 | −2.4327E−11 | 2.2092E−10 | 1.0059E−12 | −4.9928E−12 | −7.3602E−07 |
| C30 | −2.8973E−11 | 3.2758E−12 | −9.6683E−13 | −3.2831E−11 | −1.3962E−08 |
| C32 | 1.9428E−10 | 6.1132E−11 | 4.8615E−13 | 1.2634E−11 | −7.3124E−08 |
| C34 | 2.7238E−11 | 9.2837E−11 | 1.0814E−14 | 3.0879E−12 | 1.2332E−07 |
| C36 | 1.8004E−13 | −4.8682E−12 | −2.8688E−16 | 2.2522E−13 | −2.4479E−08 |

An external configuration of the prism of this numerical example is similar to that of Numerical Example 1 illustrated in FIGS. 5 and 6. In this numerical example, the maximum width W2 of the observation optical portion 402 is defined by the second surface 102 and is 52 mm. The maximum width W1 of the relay optical portion 401 is 35 mm. The maximum width W' of the connection portions 201 and 202 is 51 mm that is smaller than W2=52 mm.

NUMERICAL EXAMPLE 4

Figure 12:
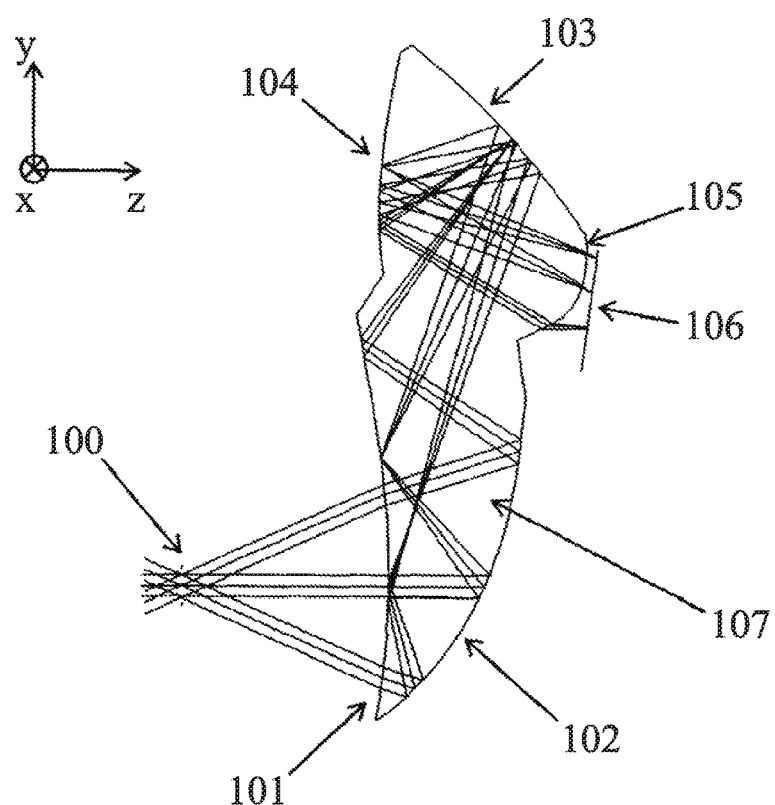
FIG. 12 illustrates an image display apparatus that is Numerical Example 4.

Table 4A shows optical data of Numerical Example 4, and FIG. 12 illustrates a sectional view of an optical path of this numerical example. In this numerical example, the image forming element 106 has a size of 18.4 mm×11.5 mm. The exit pupil 100 of the display optical system 107 has a horizontal diameter of about 5.4 mm and a vertical diameter of about 3.7 mm. The center of the exit pupil 100 is set at the rotational center position of the eyeball of the observer. The focal length of the display optical system 107 is about 13 mm. The display optical system (prism) 107 provides a horizontal angle of view of 70° and a vertical angle of view of 47° and displays an observation image at the infinite distance in the positive z-axis direction. Meanings of the optical data are identical to those of Numerical Example 1. Table 4B lists aspheric coefficients in this numerical example.

TABLE 4A

| S | TYP | R | X | Y | Z | A | Nd | vd |
|---|---|---|---|---|---|---|---|---|
| 1 | SPH | ∞ | 0 | 0 | 0 | 0 | 1.00000 | |
| 2 | FFS1 | ∞ | 0 | −20.741 | 33.112 | −9.649 | 1.53151 | 55.7 |
| 3 | FFS2 | ∞ | 0 | −9.323 | 46.071 | −35.803 | 1.53151 | 55.7 |
| 4 | FFS1 | ∞ | 0 | −20.741 | 33.112 | −9.649 | 1.53151 | 55.7 |
| 5 | FFS3 | ∞ | 0 | 112.506 | −31.436 | 81.024 | 1.53151 | 55.7 |
| 6 | FFS4 | ∞ | 0 | 36.198 | 38.454 | 22.172 | 1.53151 | 55.7 |
| 7 | FFS5 | ∞ | 0 | 41.891 | 59.957 | −66.718 | 1.00000 | |
| I | SPH | ∞ | 0 | 30.599 | 67.180 | −8.399 | | |

TABLE 4B

| Coefficient | FFS1 | FFS2 | FFS3 | FFS4 | FFS5 |
|---|---|---|---|---|---|
| C4 | −6.7645E−03 | −1.1720E−02 | −1.0383E−02 | 5.2598E−03 | −5.9234E−03 |
| C6 | −2.9748E−03 | −8.6794E−03 | −3.7987E−04 | 5.6805E−03 | 7.1259E−03 |
| C8 | −1.6780E−04 | 5.6510E−07 | −2.5958E−05 | 7.9397E−05 | −3.6276E−03 |
| C10 | −2.2562E−05 | 8.4617E−06 | 1.9042E−05 | 1.4523E−04 | −1.2279E−03 |
| C11 | 3.5292E−06 | −8.2249E−07 | −3.0234E−06 | −3.7614E−07 | 2.6478E−05 |
| C13 | 6.1945E−06 | −1.6333E−06 | 3.0387E−07 | −3.4019E−06 | −2.4306E−05 |
| C15 | −1.1178E−07 | −1.8190E−06 | −1.4282E−07 | −2.6383E−06 | −5.3137E−06 |
| C17 | −9.8369E−08 | −2.6627E−09 | −2.3139E−08 | −2.5585E−08 | 2.3421E−05 |
| C19 | −2.0918E−07 | 3.6157E−08 | 4.2398E−09 | 9.7571E−09 | 2.4262E−05 |
| C21 | 5.4070E−09 | 4.6281E−08 | −5.6364E−10 | 1.2608E−08 | 3.2047E−05 |
| C22 | −4.4957E−10 | −4.8906E−10 | 1.6069E−10 | 3.3085E−10 | −1.9043E−07 |
| C24 | 2.6898E−09 | −5.3081E−10 | 7.3716E−11 | −2.2723E−10 | −9.7584E−07 |
| C26 | 1.0683E−09 | −4.2148E−10 | 1.0535E−12 | −6.7541E−11 | −1.1353E−06 |
| C28 | −2.6910E−12 | −5.1552E−11 | 2.9939E−13 | −1.0143E−11 | −5.9893E−07 |

An external configuration of the prism of this numerical example is similar to that of Numerical Example 1 illustrated in FIGS. 5 and 6. In this numerical example, the maximum width W2 of the observation optical portion 402 is defined by the second surface 102 and is 65 mm. The maximum width W1 of the relay optical portion 401 is 57 mm. The maximum width W' of the connection portions 201 and 202 is 64 mm that is smaller than W2=65 mm.

Table 5 collectively lists values of L12/f, L45/L12, L45/L13 and W1/W2 in Numerical Examples 1 to 4. All the values satisfy the corresponding conditions, which results in compact image display apparatuses each providing a wide angle of view.

TABLE 5

|  | L12/f | L45/L13 | L45/L12 | W1/W2 |
|---|---|---|---|---|
| Example 1 | 0.808 | 0.827 | 3.070 | 0.8148 |
| Example 2 | 0.844 | 0.765 | 2.679 | 0.6897 |
| Example 3 | 0.774 | 0.787 | 3.143 | 0.6731 |
| Example 4 | 1.244 | 0.667 | 2.303 | 0.8769 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-146002, filed on Jul. 23, 2015, which is hereby incorporated by reference herein in its entirety.

What is claimed is:

1. An image display apparatus comprising:
an image forming element configured to form an original image; and
a display optical system formed by an optical element whose inside surrounded by an entrance surface, multiple reflective surfaces and an exit surface is filled with an optical medium and configured to introduce a light flux from the original image to an exit pupil,
wherein the display optical system is configured to:
cause the light flux exiting from the original image to transmit through the entrance surface to enter the inside and cause the light flux to reflect at a part of the reflective surfaces;
cause the reflected light flux to form an intermediate image in the display optical system; and
then cause the light flux to reflect at another part of the reflective surfaces and exit from the exit surface toward the exit pupil located in a first direction,
wherein the optical element comprises:
a first optical portion on which the entrance surface and the part of the reflective surfaces are formed;
a second optical portion that is provided in a second direction orthogonal to the first direction with respect to the first optical portion and on which the another part of the reflective surfaces and the exit surface are formed; and
a connection portion configured to be connected to a holding portion that is provided, as a different portion from the connection portion, for holding the optical element in the image display apparatus, and
wherein:
the first optical portion has a side face in a width direction orthogonal to the first and second directions;
the connection portion is provided so as to contact with the side face of the first optical portion and a side face of the second optical portion in the width direction and is formed so as to be included within a maximum width of the second optical portion in the width direction; and.

2. An image display apparatus according to claim 1, wherein a maximum width of the first optical portion is smaller than the maximum width of the second optical portion.

3. An image display apparatus according to claim 1, wherein the display optical system has, as the multiple reflective surfaces, four or more reflective surfaces.

4. An image display apparatus according to claim 1, wherein, in the optical element, the second optical portion is provided in a vertical direction orthogonal to the width direction with respect to the first optical portion.

5. An image display apparatus according to claim 1, wherein the exit surface serves also as a reflective surface included in the other part of the reflective surfaces.

6. An image display apparatus according to claim 1, wherein an angle of view of the display optical system is 50° or larger.

7. An image display apparatus according to claim 1, wherein the display optical system is provided for each of right and left eyes of an observer, and the width direction corresponds to a direction in which the right and left eyes are arranged.

8. An image display apparatus according to claim 1, wherein the following condition is satisfied:

$0.50 \leq W1/W2 \leq 0.95$ where W1 represents a maximum width of the first optical portion in the width direction, and W2 represents the maximum width of the second optical portion in the width direction.

9. An image display apparatus according to claim 1, wherein:
the display optical system has a first surface serving as the exit surface and one of the reflective surfaces, a second surface, a third surface and a fourth surface each serving as another one of the reflective surface and a fifth surface serving as the entrance surface;
the display optical system is configured to cause at least part of an optical path of the light flux proceeding from the fifth surface to the fourth surface to intersect with at least part of an optical path of the light flux proceeding from the third surface to the first surface; and
the display optical system satisfies at least one of the following conditions:

$0.62 \leq L12/f \leq 5.00$ $1.80 \leq L45/L12 \leq 5.00$ where, when a ray emitted from a center of an image forming area of the image forming element in which the original image is formed and passing through a center of the exit pupil is referred to as a central-view-angle principal ray, and a distance between hit points of the central-view-angle principal ray on the optical surfaces is referred to as a hit point distance, L45 represents a hit point distance between a position at which the light flux is refracted on the fifth surface and a position at which the light flux is reflected on the fourth surface, L12 represents a hit point distance between a position at which the light flux is reflected on the second surface and a position at which the light flux is refracted on the first surface, and f represents a focal length of the display optical system in a sectional view including optical paths of the central-view-angle principal ray between the optical surfaces of the optical element.

10. An image display apparatus according to claim 1, wherein the holding portion is provided at a position different from the first optical portion in the width direction.

11. An image display apparatus according to claim 1, wherein the holding portion is not an optical element.

12. An image display apparatus according to claim 1, wherein the holding portion is not an optical element for forming an optical path in the display optical system.

* * * * *